May 23, 1950     W. G. MILLER     2,508,793
FLOW CONTROL DEVICE
Filed Oct. 2, 1948
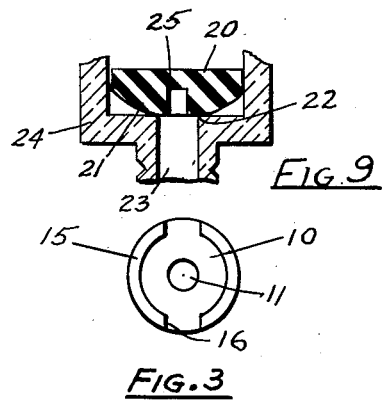
FIG. 9
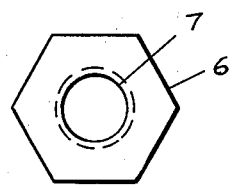
FIG. 2
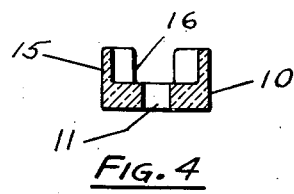
FIG. 3
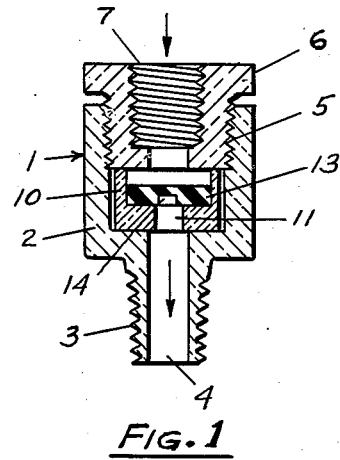
FIG. 1
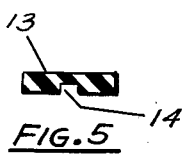
FIG. 4
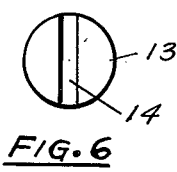
FIG. 5
FIG. 6
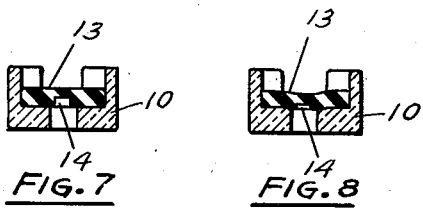
FIG. 7     FIG. 8
INVENTOR.
WESLEY G. MILLER
BY
Florean G. Miller
Atty Patented May 23, 1950

2,508,793

UNITED STATES PATENT OFFICE 2,508,793

FLOW CONTROL DEVICE

Wesley G. Miller, Erie, Pa., assignor to Hays Manufacturing Company, Erie, Pa., a corporation of Pennsylvania Original application April 5, 1947, Serial No. 739,551, now Patent No. 2,460,647, dated February 1, 1949. Divided and this application October 2, 1948, Serial No. 52,533

8 Claims. (Cl. 138—43)

This invention relates generally to flow control devices for controlling the flow of fluid through a pipe line which varies in pressure and temperature. This application is a division of my Patent No. 2,460,647.

No device has heretofore been provided to control the flow of fluid through a pipe line which varied greatly in temperature and pressure so that a substantially constant flow of fluid eminated from the outlet end thereof. Resilient, cylindrically shaped members having an aperture extending axially thereof which is restricted on an increase in pressure can only control the flow within very wide limits, especially in the higher pressure limits, in that the central aperture of the flow control member is directly in axial alignment with the inlet and the outlet of the flow control member and only a very limited restriction takes place. When the central portion of a flow control member having a central aperture flexes downwardly into a larger outlet aperture, the control is likewise negligible at higher pressures because the resilient member quickly reaches its maximum restricted position. These prior devices become fatigued very quickly and where temperatures vary an appreciable amount, the central apertures vary in size on change in temperature thereby making control practically impossible.

It is, accordingly, an object of my invention to overcome the above and other defects in flow control devices and it is more particularly an object of my invention to provide a flow control device which is simple in construction, economical in cost, efficient in operation, and economical in manufacture.

Another object of my invention is to provide a flow control device in a fluid line which controls the quantity of fluid passing therethrough regardless of the variations in pressure of the fluid.

Another object of my invention is to provide a fluid control device in a fluid line which permits maximum flow of fluid while controlling the quantity of fluid passing from the line.

Another object of my invention is to provide a flow control device which has a maximum useful life and which controls the flow of fluid over wide pressure changes.

Other objects of my invention will become evident from the following detailed description, taken in conjunction with the accompanying drawings, in which Fig. 1 is a vertical sectional view of a flow control device illustrating a preferred embodiment of my invention;

Fig. 2 is a plan view of my novel flow control device shown in Fig. 1;

Fig. 3 is a plan view of an insert member for use in the flow control device shown in Fig. 1;

Fig. 4 is a vertical sectional view taken through the insert member of Fig. 3;

Fig. 5 is a side elevational view of the flow control washer used in my novel flow control device;

Fig. 6 is a bottom view of the flow control washer shown in Fig. 5;

Fig. 7 is a vertical sectional view showing my novel flow control washer disposed in the insert member shown in Figs. 3 and 4;

Fig. 8 is a vertical sectional view of the insert member with my novel flow control washer disposed therein with the groove therein slightly restricted; and Fig. 9 is a vertical sectional view of a modified form of flow control member.

Referring now to the drawings, I show in Figs. 1 to 8 inclusive, as illustrative of an embodiment of my invention, a flow control member 1 for disposal in a pipe line comprising a cylindrically shaped body 2, an externally threaded extension 3 having an outlet aperture 4, an internally threaded portion 5 for threadably engaging a threaded adapter 6 having a threaded aperture 7 providing an inlet for the flow of fluid into the flow control member 1. An open cup-shaped insert member 10 has a central aperture 11 for alignment with the outlet 4 in flow control member 1. The insert member 10 is disposed in the flow control member 1 as shown in Fig. 1. A flat, cylindrically shaped resilient member 13 having a rectangular shaped groove 14 is disposed over the aperture 11 in the insert member 10 to control the flow of fluid passing from the inlet 7 to the outlet 4 of the flow control member 1. The insert member 10 has the upper wall portions 15 thereof cut away at 16 to permit the lateral flow of fluid from the inlet 7 to pass around the outer side of the resilient member 13 through the groove 14 and into the aperture 11 to the outlet 4. The aperture 11 is preferably made of a sufficiently greater cross-sectional area than the cross-sectional area of the groove 14 in the resilient member 13 to permit free flow of fluid therethrough. The resilient member 13 is preferably made of a flexible resilient material such as rubber although any suitable resilient material may be used.

In operation, the flow control member 1 is threadably engaged with suitable piping, the inlet pipe attached to the threaded aperture 7 and the outlet pipe threadably attached to the threaded extension 3. A fluid passes downwardly through the inlet aperture 7 against the upper side of the resilient member 13 wherein it passes laterally outwardly around the member 13 and through the groove 14 to the aperture 11 in the insert member 10 and then to the outlet 4 of the flow control member 1. As the pressure increases, the grooved portion 14 of the resilient member 13 is compressed and the cross-sectional area thereof is restricted as shown in Fig. 8 to provide a barrier to the flow of fluid therethrough. It has been found that the flow of fluid through a fluid line can be controlled by my novel flow control device so that the quantity of fluid passing therefrom does not vary any substantial amount upon passage of a comparatively large volume of fluid even though the variations in the pressure of the fluid may be from two pounds per square inch to two hundred pounds per square inch.

Although the flow control member 1 in Fig. 1 is shown with an insert member 10 disposed therein, it will be evident that it may be eliminated and the resilient member 13 disposed directly over the outlet aperture 4 to produce the same result.

In Fig. 9, I show a modified form of the resilient member 13 shown in Fig. 1 wherein a cylindrical shaped elastic resilient member 20 has the bottom side thereof formed with an inverted crown 21 with a flattened portion 22 for seating over the outlet aperture 23 of a flow control member 24. Radially extending grooves 25 are formed in the crown 21 leading to the outlet 23 of the flow control member 24. In the operation of resilient member 20, the outer peripheral portions thereof are forced progressively downwardly while the pressure in the line is comparatively low to gradually decrease the size of the grooves 25 to restrict them to the flow of fluid therethrough to the outlet 23. After the outer peripheral portion of the washer 20 has been forced downwardly a predetermined amount, the grooves 25 in the member 20 restrict upon an increase in pressure to further restrict the flow of fluid as has been heretofore described for the resilient member 13 shown in Fig. 5.

From the foregoing it will be seen that I have provided a novel flow control device which controls the quantity of fluid passing from a pipe line regardless of the changes of pressure of the fluid within practical limits and I further provide a flow control device with no moving parts and with a minimum of wearing parts.

Various changes may be made in the specific embodiment of my invention without departing from the spirit thereof or from the scope of the appended claims.

What I claim is:

1. A flow control device for varying pressure fluids comprising a member having an outlet aperture, and a resilient member for disposal over said aperture having a laterally extending grooved passage leading to said aperture adapted to be restricted upon increase in the pressure of the fluid.

2. A flow control device for varying pressure fluids comprising a member having an inlet and an outlet aperture, said outlet aperture having a shoulder adjacent thereto, and a resilient member disposed over said outlet aperture having radially outwardly extending grooved passages leading to said aperture adapted to be restricted upon increase in pressure of the fluid passing through said member for controlling the quantity of fluid passing therethrough.

3. A flow control device for varying pressure fluids comprising a member having an inlet and an outlet aperture, an insert member disposed over said outlet aperture having a central aperture for alignment with said outlet aperture, and a resilient member for disposal over the said aperture in said insert member having a grooved passage therein for controlling the quantity of fluid passing through said member.

4. A flow control device for varying pressure fluids comprising a member having an inlet and an outlet aperture, an insert member disposed over said outlet aperture having a central aperture for alignment with said outlet aperture, said insert member being cup-shaped in form and having portions of the sides thereof cut away, and a resilient member for disposal over said aperture in said insert member having a diametrically extending groove for the passage of fluid to said outlet aperture, the cross-sectional area of said grooved passage being restricted to the flow of fluid upon increases in the pressure of said fluid.

5. A flow control device comprising a member having an outlet aperture, and a resilient member for disposal over said aperture having a grooved passage for the flow of fluid to said outlet aperture adapted to be restricted upon an increase in the pressure of the fluid passing through said member.

6. A flow control device comprising a member having an outlet aperture and a resilient member for disposal over said aperture having an inverted crowned portion with a grooved passage for the flow of fluid to said outlet aperture adapted to be restricted upon an increase in the pressure of the fluid passing through said member.

7. A flow control device as set forth in claim 6 wherein the bottom portion of said inverted crown is flattened to provide a seat for seating over the outlet aperture of said member.

8. A flow control device for varying pressure fluids comprising a member having an outlet aperture and a resilient elastic member having an inverted crowned portion for disposal over said aperture, said crowned portion having a laterally extending grooved passage leading to said aperture adapted to be restricted upon the deflection of the outer peripheral portion of said resilient member and adapted to be further restricted after the maximum downward deflection of the outer peripheral portion of said resilient member.

WESLEY G. MILLER.

REFERENCES CITED

The following references are of record in the file of this patent:

UNITED STATES PATENTS

| Number | Name | Date |
| --- | --- | --- |
| 1,964,300 | Perry et al. | June 26, 1934 |
| 2,460,647 | Miller | Feb. 1, 1949 |